United States Patent [19]

Ito

[11] Patent Number: 4,791,981
[45] Date of Patent: Dec. 20, 1988

[54] AIR CONDITIONING APPARATUS FOR AUTOMOTIVE VEHICLES

[75] Inventor: Toshikazu Ito, Ibaraki, Japan

[73] Assignee: Hitachi, Ltd., Tokyo, Japan

[21] Appl. No.: 374

[22] Filed: Jan. 5, 1987

[30] Foreign Application Priority Data

Jan. 8, 1986 [JP] Japan ................................. 591/86

[51] Int. Cl.⁴ ...................... F25B 29/00; G05D 23/00
[52] U.S. Cl. ..................................... 165/22; 165/42;
165/43; 237/12.3 B; 98/2.08; 98/2.09; 98/2.11
[58] Field of Search ........................... 165/22, 42, 43;
98/2.05, 2.08, 2.09, 2.11; 237/12.3 A, 12.3 B

[56] References Cited

U.S. PATENT DOCUMENTS

| | | | |
|---|---|---|---|
| 4,453,591 | 6/1984 | Fehr | 165/42 |
| 4,478,274 | 10/1984 | Naganoma et al. | 165/42 |
| 4,562,954 | 1/1986 | Kajita | 165/42 |
| 4,615,357 | 10/1986 | Ito | 165/42 |
| 4,681,153 | 7/1987 | Uchida | 165/43 |

FOREIGN PATENT DOCUMENTS

| | | | |
|---|---|---|---|
| 0026010 | 2/1982 | Japan | 165/43 |
| 57-130809 | 8/1982 | Japan | |
| 0186512 | 11/1982 | Japan | 165/43 |

Primary Examiner—Albert W. Davis, Jr.
Assistant Examiner—John K. Ford
Attorney, Agent, or Firm—Antonelli, Terry & Wands

[57] ABSTRACT

An air conditioning apparatus of an air mix type for automotive vehicles has two air conditioning mechanisms which are provided for an upper air outlet and a lower air outlet, respectively. The upper air outlet is split into a vent outlet and a defroster outlet, and a defroster/vent change-over door is mounted at the upper air outlet to switch the same between the defroster outlet and the vent outlet so that when one is open, the other is closed. A communication passageway is provided in the apparatus to connect the lower air outlet to the defroster outlet. A defroster door is mounted in the communication passageway to open and close the same so that part of the conditioned air at the lower air outlet can be transferred to the defroster outlet to ensure blow of conditioned air both through the defroster outlet and the vent outlet.

6 Claims, 2 Drawing Sheets

AIR CONDITIONING APPARATUS FOR AUTOMOTIVE VEHICLES

BACKGROUND OF THE INVENTION

This invention relates to an air conditioning apparatus of an air mix type suitable for use in automotive vehicles.

This type of air conditioning apparatus of the prior art comprises a heating device, such as a heater core, for heating air to provide warm air which is mixed in suitable proportions with cool air that has bypassed the heating device, to provide conditioned air of a desired temperature. The conditioned air produced in this way is discharged in two air currents, one air current being released into an upper portion of the interior of the vehicle and the other air current being discharged into a lower portion thereof. The air conditioning apparatus comprises vent add defroster outlets for handling the currents of conditioned air released into the upper portion, of which the former directs the conditioned air against an upper half body of a rider, and the latter outlet directs the conditioned air against the windshield. When the conditioned air is released into the upper portion of the interior of the vehicle, it is discharged through either the vent outlet or the defroster outlet by changing over the air outlets. In the wintertime when the operation of the air conditioning apparatus is switched to a heater mode, the conditioned air is released through the defroster outlet to prevent the windshield from dimming. This has made it impossible to operate the air conditioning apparatus in a bi-level operation mode to enable the rider to enjoy travelling in comfort by directing the conditioned air in two currents through the vent outlet and a floor-level air outlet against the upper half body and the feet, respectively, of the rider.

A proposal has been made to use an air conditioning apparatus which comprises air conditioning mechanisms each located at one of a vent outlet and a floor-level air outlet, as disclosed in Japanese Patent Unexamined Publication No. 130809/82 which has among its inventors the inventor of the present application. In this air conditioning apparatus, it is possible to vary the temperature of a current of conditioned air released through the vent outlet from that of a current of conditioned air released through the floor-level air outlet. However, the apparatus is constructed such that a passageway for the conditioned air flowing to the defroster outlet is branched off from the floor-level air outlet, so that the conditioned air can be released from either the floor-level air outlet or the defroster outlet.

SUMMARY OF THE INVENTION

This invention has a primary object of providing an air conditioning apparatus suitable for use in automotive vehicles which enables the rider to travel in comfort by operating in a bi-level operation mode even in the wintertime.

To accomplish the aforesaid object, the invention provides, in an air conditioning apparatus suitable for use in automotive vehicles comprising two air conditioning mechanisms each located at one of two air outlets or upper and lower air outlets, the construction which enables part of conditioned air at the lower air outlet to be transferred to a defroster outlet, so that blow of the conditioned air from a vent outlet can be secured even in a heater mode.

More specifically, according to the invention, there is provided an air conditioning apparatus of an air mix type comprising air conditioning mechanisms each located at one of two air outlets or upper and lower air outlets, wherein the upper air outlet branches out into a vent outlet and a defroster outlet and is provided with defroster/vent door means for switching the vent outlet and the defroster outlet so that when one of them is open the other is closed, a communication passageway is provided between a second conditioned air passageway which leads to the lower air outlet and the defroster outlet, and defroster door means is provided for opening and closing the communication passageway.

The foregoing object and feature, and other objects, features and advantages of the invention will become more apparent from the description of the embodiment set forth hereinafter when considered in conjunction with the accompanying drawings.

DETAILED DESCRIPTION OF THE PREFERRED EMBODIMENT

Figure 1:
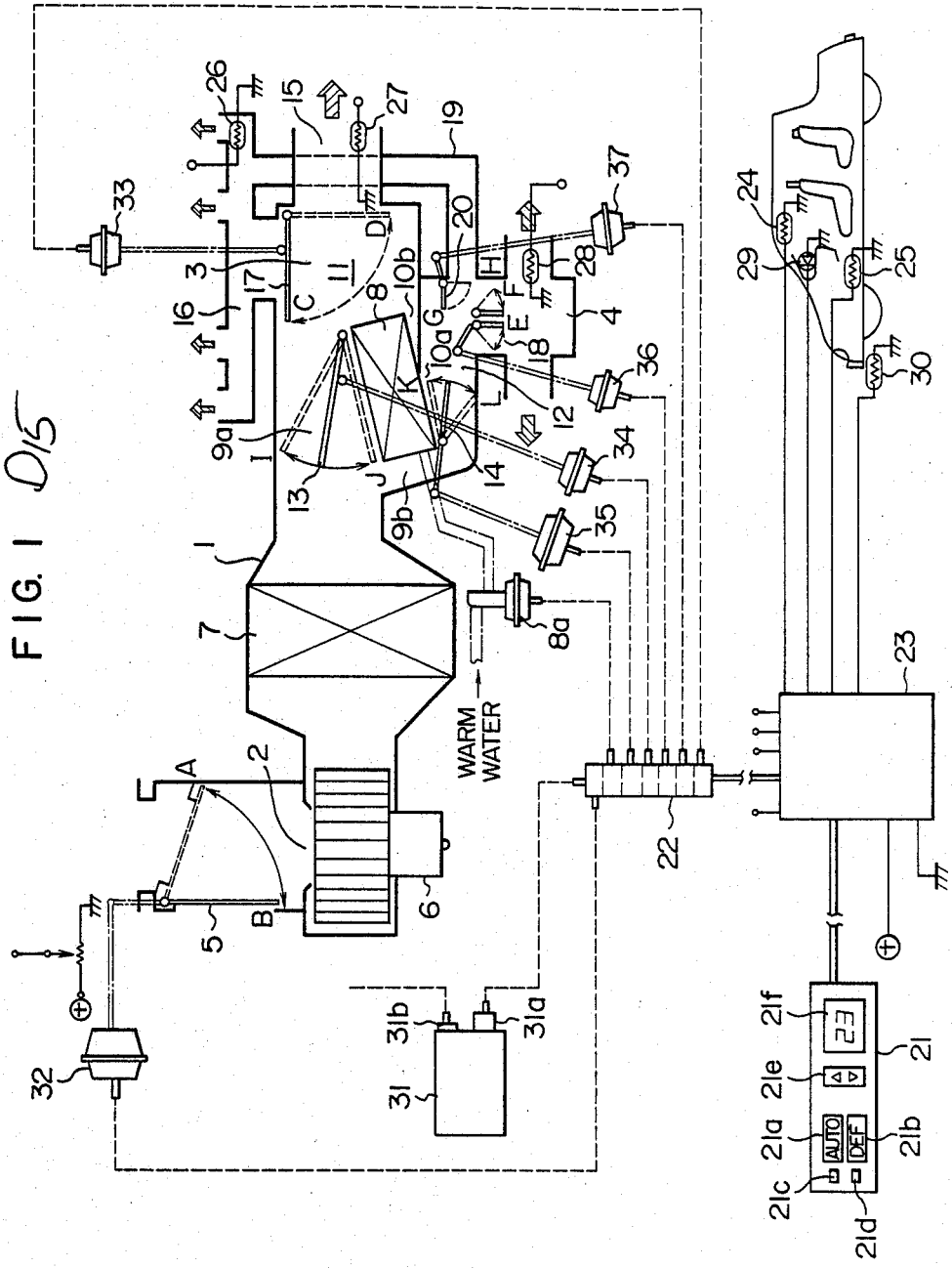
FIG. 1 is a schematic view of the air conditioning apparatus suitable for use in automotive vehicles which comprises one embodiment of the invention.

FIG. 1 shows the overall structure of the air conditioning apparatus of the reheat air mix type according to the embodiment of the invention. The air conditioning apparatus comprises a duct casing 1 formed of a material such as heat resistant plastic, and the duct casing is adapted to be mounted below a dashboard of an automotive vehicle. The casing 1 has an air inlet port 2 formed at one end portion thereof and an upper air outlet 3 and a lower floor-level air outlet 4 at an opposite end portion of the casing. An air passageway is defined between the air inlet port 2 and the air outlets 3 and 4.

An indoor/outdoor air change-over door 5 is mounted at the air inlet port 2 of the casing 1 to switch the system between indoor air circulation and outdoor air circulation or to decide whether air should be introduced into the air conditioning apparatus from the interior of the vehicle or from outside the vehicle. Blower means 6 is mounted in the casing 1 downstream of the air inlet port 2 and comprises a blower driven for operation by an electric motor. In the casing 1, an evaporator 7 is located downstream of the blower means 6, and heater means 8 comprising a heater core is located downstream of the evaporator 7. The evaporator 7 is connected to a refrigeration system, not shown, and functions to cool the air introduced into the air conditioning apparatus. Water for cooling the engine of the automotive vehicle is introduced through a control valve 8a into the heater core, and the heater core uses the engine cooling water as a heat source to heat the air which flows through the casing 1. The evaporator 7 and heater means 8 are of known construction, so that the detailed description thereof shall be omitted.

As shown in FIG. 1, the evaporator 7 extends across the air passageway in the casing 1 so as to cool all the air introduced into the casing through the air inlet port 2. Meanwhile the heater means 8 is disposed at a location which is spaced apart from opposite side walls of the casing 1, to define a main cool air passageway 9a on one side of the heater means 8 and an auxiliary cool air passageway 9b on the opposite side of the heater means 8. The main and auxiliary cool air passageways 9a and 9b both bypass the heater means 8. The casing 1 has a partition in the air passageway at a location downstream of the heater means 8 for dividing the air passageway into a main warm air passageway 10a and an auxiliary warm air passageway 10b. The auxiliary warm air passageway 10b and main warm air passageway 10a join the main cool air passageway 9a and auxiliary cool air passageway 9b to form a first conditioned air passageway 11 and a second conditioned air passageway 12, respectively. The first conditioned air passageway 11 and second conditioned air passageway 12 lead to the upper air outlet 3 and lower floor-level air outlet 4, respectively.

A first air mix door 13 is mounted for movement in the main cool air passageway 9a to open and close the passageway 9a and also to adjust the degree at which the passageway 9a is open, so as to vary the mixing proportions of cool air and warm air in the first conditioned air passageway 11. Also, a second air mix door 14 is mounted at the confluence of the auxiliary cool air passageway 9b and main warm air passageway 10a to vary the mixing proportions of cool air and warm air in the second conditioned air passageway 12. In the embodiment shown and described hereinabove, the main passageways for both warm air and cool air are constructed to each have a larger cross-sectional area than the auxiliary passageways.

The upper air outlet 3 is split into a defroster outlet 16 which directs the conditioned air against the windshield to prevent same from dimming, and a vent outlet 15 adapted to release the conditioned air therethrough and direct same toward the upper half portion of the body of a rider. A vent/defroster change-over door 17 is mounted at the upper air outlet 3 so as to switch the upper air outlet 3 between the vent outlet 15 and the defroster outlet 16 by selectively opening one of them and closing the other. Meanwhile the lower floor-level air outlet 4 has a floor-level door 18 for controlling the conditioned air flowing therethrough. In a portion of the second conditioned air passageway 12 downstream of the floor-level door 18, a communication passageway 19 is provided to connect the second conditioned air passageway 12 to the defroster outlet 16, and a defroster door 20 is provided for opening and closing the second conditioned air passageway 12 to bring same into and out of communication with the defroster outlet 16.

Currents of air flowing through the air conditioning apparatus of the aforesaid construction will now be described. Upon actuation of the blower means 5, air is introduced into the casing 1 through the air inlet port 2 from either the interior of the vehicle or outside the vehicle depending on the position of the indoor/outdoor air change-over door 5. All the air introduced into the casing 1 passes through the evaporator 7 where it is cooled and moisture is removed therefrom to provide cool air. Part of the thus cooled air enters the main and auxiliary cool air passageways 9a and 9b depending on the degrees of openings of the first and second air mix doors 13 and 14, while the rest of the cool air passes through the heater means 8 and is heated to provide warm air.

The warm air provided by the heater means 8 is split into two currents which flow through the main and auxiliary warm air passageway 10a and 10b respectively.

The warm air current flowing through the main warm air passageway 10a is mixed with the cool air current flowing through the auxiliary cool air passageway 9b to provide an air mix or conditioned air which enters the second conditioned air passageway 12, from which it flows toward the communication passageway 19 and lower floor-level air outlet 4. Meanwhile, the warm air current flowing through the auxiliary warm air passageway 10b is mixed with the cool air current flowing through the main cool air passageway 9a to provide an air mix or conditioned air.

The conditioned air thus obtained flows through the first conditioned air passageway 11 toward the upper air outlet 3. In this way, the air currents flowing through the casing and released through the upper and lower air outlets are adjusted independently, so that the temperatures of air in the upper and lower portions of the interior of the body of the vehicle can be separately controlled.

Operation modes of the air conditioning apparatus according to the invention will now be described. When it is desired to cool the interior of the vehicle as soon as possible, the apparatus is switched to an indoor air circulation mode in the which the indoor/outdoor air changeover door 5 is moved to a position A shown in FIG. 1. Also, the vent/defroster change-over door 17, floor door 18 and defroster door 20 are moved to positions C, E and G, respectively, in FIG. 1. The first and second air mix doors 13 and 14 are moved to positions J and K, respectively, in FIG. 1, so that the cool air will not flow through the heater means 8. This allows the apparatus to maximize its cooling function to produce cool air which flows through the vent outlet 15, lower floor-level air outlet 4 and defroster outlet 16 into the interior of the vehicle.

When it is desired to adjust the temperature of the conditioned air, the apparatus is switched to an outdoor air introduction mode in which the indoor/outdoor air change-over door 5 is moved to a position B in FIG. 1, so as to effect ventilation. In the meantime, the vent/defroster change-over door 17, floor door 18 and defroster door 20 are kept in the same positions as those in the indoor air circulation mode. The first and second air mix doors 13 and 14 are moved to suitable positions to provide conditioned air of a desired temperature by mixing warm air with cool air.

Figure 2:
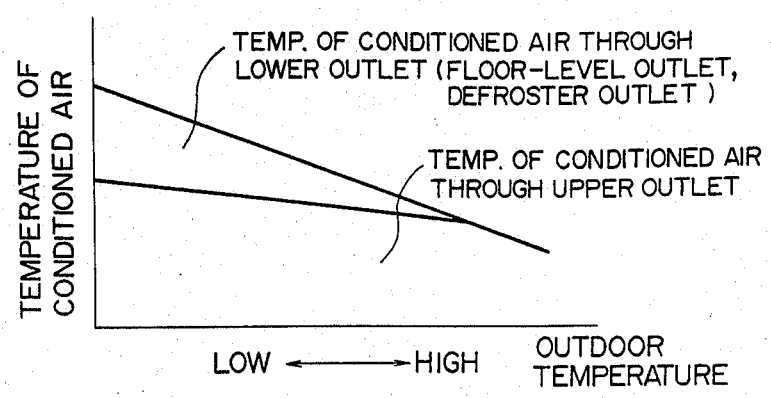
FIG. 2 is a diagrammatic representation of the temperature characteristics of blown air in the embodiment shown in FIG. 1.

In the embodiment shown and described hereinabove, the main passageways are greater in cross-sectional area than the auxiliary passageways regardless of whether they are for warm air or cool air. Accordingly, the cool air has a higher proportion than the warm air in the first conditioned air passageway 11, and the warm air has a higher proportion than the cool air in the second conditioned air passageway 12. Thus the conditioned air released through the lower floor-level air outlet 4 and defroster outlet 16 is higher in temperature than the conditioned air released through the upper air outlet 3, as shown in FIG. 2.

Figure 3:
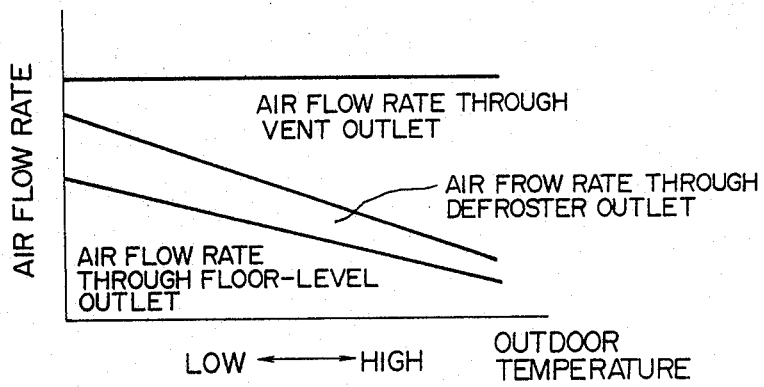
FIG. 3 is a diagrammatic representation of the distribution characteristics of the flow rate of conditioned air in the embodiment shown in FIG. 1.

FIG. 3 shows the distribution rates of conditioned air released through the respective outlets into the interior of the vehicle.

Referring to FIG. 1 again, a control device suitable for use in combination with the air conditioning apparatus of the aforesaid construction according to the invention will be described. The control device comprises an operation panel 21 mounted on the dashboard, and a control unit 23 for actuating a control valve assembly 22 in accordance with the operation mode and temperature set at the operation panel 21. The control unit 23 is connected with an upper portion temperature sensor 24, a lower portion temperature sensor 25, a defroster duct temperature sensor 26, a vent duct temperature sensor 27, a floor duct temperature sensor 28 and outdoor temperature sensors 29 and 30. Meanwhile, the control valve assembly 22 is connected to a vacuum tank 31 via a control valve 31a, and is operative to control the movement of each door by using a subatmospheric pressure. The vacuum tank 31 is connected via a check valve 31b to a subatmospheric pressure source, not shown, which may be in engine. The indoor/outdoor air change-over door 5, vent/defroster change-over door 17, first and second air mix doors 13 and 14, floor door 18 and defroster door 20 are connected with actuators 32, 33, 34, 35, 36 and 37, respectively, which are actuated by a subatmospheric pressure to move the respective doors.

The operation panel 21 has thereon automatic air conditioning operation mode button 21a, a defroster mode operation button 21b, indication lamps 21c and 21d for the buttons 21a and 21b respectively, a temperature setting button 21e and a set temperature indication panel 21f.

When it is desire to let the air conditioning system operate in the automatic air conditioning operation mode, button 21a is depressed. This lights the indication lamp 21c and actuates the control valve assembly 22 under control effected by the control unit 23. As a result, subatmospheric pressure is introduced into the actuators 32, 33, 36 and 37 to move the indoor/outdoor air changeover door 5, vent/defroster change-over door 17, floor door 18 and defroster door 20 to positions shown by solid lines in FIG. 1. Consequently, the conditioned air is released into the interior of the vehicle through the vent outlet 15, lower floor-level air outlet 4 and defroster outlet 16. Meanwhile button 21e is depressed to set the temperature at a desired level. This causes the control unit 23 to move the first air mix door 13 such extent that the upper portion temperature sensor 24 detects the desired temperature in the upper portion of the interior of the vehicle, so that the temperature of the conditioned air at the air vent 15 can be automatically controlled to a set level. The control unit 23 also moves the second air mix door 14 such extent that the lower portion temperature sensor 25 detects the desired temperature in the lower portion of the interior of the vehicle, so that the temperature of the conditioned air at the lower floor-level air outlet 4 and defroster outlet 16 can be also automatically controlled to a set level. In this way, conditioned air currents of desired temperatures are released through the vent outlet 15 and lower floor-level air outlet 4, thereby enabling the rider to enjoy traveling in comfort while the air conditioning system operates in a bi-level operation mode.

When it is desired to switch the system to a defroster operation mode, button 21b on the operation panel 21 is depressed to light the indication lamp 21d. In this operation mode, the vent/defroster change-over door 17 and floor door 18 are moved to positions D and F, respectively, shown in FIG. 1 under control effected by the control unit 23, although the indoor/outdoor air changeover door 5 and defroster door 20 remain in th same positions as those in the automatic air conditioning operation mode. As a result, all the conditioned air at the upper air outlet 3 and lower air outlet 4 is released through the defroster outlet 16 and directed against the windshield, thereby quickly defrosting the windshield.

While the embodiment of the invention has been described hereinabove as using the control device for enabling the air conditioning system to operate in an automatic air conditioning operation mode, it is to be understood that the invention is not limited to this type of operation and that a control device including a manually operative lever mechanism can be used in combination with the air conditioning apparatus according to the invention to effect control of conditioned air manually. In the embodiment of the air conditioning apparatus constructed as described hereinabove, the communication passageway 19 is located downstream of the floor door 18. The invention is not limited to this arrangement and the communication passageway 19 may be made to open upstream of the floor door 18.

From the foregoing description, it will be appreciated that the invention enables, in an air conditioning apparatus of an air mix type suitable for use in automotive vehicles, part of the conditioned air at the lower air outlet to be transferred to the defroster outlet while ensuring that conditioned air is also released through the vent outlet. This feature allows conditioned air to be released through the vent outlet and the lower air outlet on the floor level while allowing part of the conditioned air at the lower are outlet to be released through the defroster outlet to avoid dimming of the windshield. Thus the air conditioning apparatus according to the invention enables the rider to enjoy travelling in comfort all the year round because the air conditioning apparatus can operate in a bi-level operation mode even in winter.

While the present invention has been shown and described by referring to one preferred embodiment thereof, it is to be understood that the invention is not limited to the specific form of the embodiment and that many changes and modifications may be made therein without departing from the scope of the invention as claimed.

What is claimed is:

1. An air conditioning apparatus for an automotive vehicle comprising:
    a casing formed with an air inlet, an upper air outlet opening into a vehicle interior and a lower floor-level air outlet opening in a floor area of the vehicle;
    blower means for introducing air into said casing through said air inlet and delivering the air to each said air outlet;
    heater means in said casing for heating the air introduced into the casing to provide warm air;
    a main cool air passageway and an auxiliary cool air passageway in said casing between the air inlet and the upper and lower outlets and extending therethrough to bypass said heater means;
    a main warm air passageway and an auxiliary warm air passageway in said casing downstream of the heater means, said auxiliary warm air passageway and main warm air passageway being joined to said main cool air passageway and auxiliary cool air passageway, respectively, to provide a first conditioned air passageway and a second conditioned air passageway so as to mix the warm air in contact with the heating means with cool air allowed to bypass the heater means through the cool air passageways, said first conditioned air passageway being connected to said upper air outlet and said second conditioned air passageway being connected to said lower floor-level air outlet; and first and second air mix door means provided at a joint of said main cool air passageway and auxiliary warm air passageway and at a joint of said auxiliary cool air passageway and main warm air passageway, respectively, to regulate proportions of cool air and warm air mixed together, said upper air outlet is split into a defroster outlet and a vent outlet, defroster/vent change-over door means is provided at the upper air outlet to switch the upper air outlet so that one of the defroster outlet and the vent outlet is open and the other is closed, a communication passageway is provided to connect said second conditioned air passageway to said defroster outlet, and defroster door means is mounted in the communication passageway for opening and closing the same so as to connect said communication passageway to said defroster outlet independently of said defroster/vent change-over door means to provide conditoned air to said defroster outlet when said defroster/vent change-over door means closes the defroster outlet.

2. An air conditioning apparatus as claimed in claim 1, wherein floor door means is mounted in said second conditioned air passageway for opening and closing the same, and said communication passageway is connected to the second conditioned air passageway at a position located upstream of said floor door means.

3. An air conditioning apparatus as claimed in claim 1, wherein said communication passage is downstream of said defroster/vent change-over door means.

4. In a vehicle air conditioning apparatus having a casing with a lower outlet opening at a floor area of a vehicle, an upper air outlet defining a defroster outlet adjacent a vehicle window and a vent outlet opening into a passenger-occupied space in the vehicle, and means for blowing air through the casing which is divided into first main and auxiliary streams in which cooler air can selectively flow around a heater core and second main and auxiliary streams in which heated air can selectively flow from said heater core a first means for selectively mixing in a first conditioned air passageway connected with the upper air outlet opening and said vent outlet opening the first main stream of cooled air with the second auxiliary stream of heated air, and second means for selectively and said vent outlet opening mixing in a second conditioned air passageway connected with the lower outlet opening the first auxiliary stream of cooled air with the second main stream of heated air, and a selective connecting means for selectively closing said first conditioned air passageway from the upper air outlet opening, the improvement comprising a communication passage connecting the second conditioned air passageway and the defroster outlet, and a door in the communication passage movable between an open and closed position for selectively admitting air from the second conditioned air passageway to the defroster outlet independently of said means for selectively connecting said first conditioned air passageway with said upper air outlet to provide conditioned air to said defroster outlet when said selective connecting means closes the defroster outlet to permit independent temperature control of conditioned air through the defroster outlet and the lower outlet.

5. In a vehicle air conditioning system according to claim 4, the first main stream is of greater cross-sectional area than the first auxiliary stream in a direction transverse to the flow, and the second main stream is of greater cross-sectional area than the second auxiliary stream in a direction transverse to the flow.

6. In a vehicle air conditioning system according to claim 4, wherein said communication passage is downstream of said selective connecting means.

* * * * *